United States Patent [11] 3,549,117

[72] Inventor Donald E. Hanson
 825 Burnett Ave. Apt. 12, San Francisco, Calif. 94131
[21] Appl. No. 808,476
[22] Filed Mar. 19, 1969
[45] Patented Dec. 22, 1970

[54] VIBRATION CONTROLLED VALVE AND SYSTEM
 6 Claims, 4 Drawing Figs.
[52] U.S. Cl. ............................................... 251/30, 137/81.5
[51] Int. Cl. ....................................................... F16k 31/10
[50] Field of Search ........................................ 251/30, 129; 137/81.5

[56] References Cited
UNITED STATES PATENTS
| | | | | |
|---|---|---|---|---|
| 2,393,427 | 1/1946 | Sparrow | | 251/30 |
| 2,635,635 | 4/1953 | Eimermann | | 251/30 |
| 2,962,002 | 11/1960 | Hayner | | 251/30X |
| 3,071,154 | 1/1963 | Cargill et al. | | 251/129X |
| 3,265,350 | 8/1966 | Yount et al. | | 251/30 |
| 3,266,513 | 8/1966 | Voit, Jr. | | 251/129X |
| 3,372,899 | 3/1968 | McPherson | | 251/30X |

*Primary Examiner*—Samuel Scott
*Attorney*—Gregg & Hendricson

ABSTRACT: A control system for valves connected to a common header in which a vibration-responsive valve actuator is associated with each valve and communicates with the header. A control unit connected to the header includes a vibration generator establishing selected frequency vibrations of fluid in the header to resonantly energize selected actuators for operation of the valves associated therewith. The actuator includes a metallic vibration-responsive element having a predetermined resonant frequency mounted in a magnetic field and the actuator may be physically embodied in the valve structure or disposed adjacent and connected to the valve.

PATENTED DEC 22 1970　　　　　　　　　　　　3,549,117

INVENTOR
DONALD E. HANSON
BY Gregg & Hendricson
ATTORNEYS

VIBRATION CONTROLLED VALVE AND SYSTEM

BACKGROUND OF INVENTION

Many developments have been made in the field of remote valve control and it has become quite common to employ pilot valves, for example, for controllably operating larger valves. Particularly in complex piping systems it is advantageous to be able to controllably operate selected valves from a central location and one conventional system of this type applicable with airflow systems employs a plurality of small air valves at the central location with the output of each extending to an associated main valve for controlled operation of the latter. The main valves in such a system would direct flow of the fluid from a header to the operating equipment in the system, such as a piston or air motor, for example. This system, which is widely employed, has the disadvantage of requiring about as much piping for valve control as is employed in the main lines of the system. Other remote control valve systems generally suffer from similar drawbacks particularly in the area of complexity of the systems.

It is provided by the present invention that the regular piping of a system having valves therein shall be employed as the conduit for transmittal of control signals to the separate valves. This then materially reduces the complexity and costs of multiple valve remote control systems, and at the same time enhances the reliability thereof.

SUMMARY OF INVENTION

The present invention provides a new valve control and system employing same. In general the invention may be summarized as comprising control means adapted to communicate with a header of a piping system and having a vibration generator such as an audio oscillator controllably operable at a plurality of different predetermined frequencies. This control means selectively generates a predetermined frequency of vibrations and transmits such vibrations through fluid in the header or pipe to each of a plurality of valves connected at various locations to said header or pipe. Each of the valves is operated by an actuator including a vibration-responsive element communicating with the valve passage or header and means establishing a magnetic field within which such element is disposed. The element may be formed internally of the valve body or disposed adjacent same as long as it does communicate freely with the valve passage or a pipe adjacent same so that vibrations transmitted through the fluid are received by the element.

The vibration-responsive element of each valve actuator has a predetermined different and nonharmonic resonant frequency. By transmitting vibrations form the control means at a frequency which is the resonant frequency of a particular predetermined actuator, the vibration-responsive element of such actuator will then be vibrated in the magnetic field to generate an electric current which in turn is employed to control or operate valve actuating means so as to move the movable member of the valve. It will be appreciated that vibrations generated at the control means are transmitted to the vibration-responsive elements of each valve actuator connected to the header, only the valve actuator having the resonant frequency of the element thereof substantially equal to the frequency of transmitted vibrations will have the element materially moved in its magnetic field to generate a sufficient current for actuating the associated valve. In order to prevent inadvertent valve actuation it is also necessary to ensure that the resonant frequency of each vibration-responsive element is neither the same as nor a harmonic of the resonant frequency of any other such element in the system.

The invention is described below with reference to an air system and air valves however, it is to be appreciated that this invention is equally applicable for any type of valve system wherein a material is to be controllably passed by valving means. The term "fluid" is herein employed as defining the material that may pass through the system and is intended to encompass liquids, gasses, slurries, and in fact, any type of flowable material. It is further noted with respect to the illustrated and described embodiment of the present invention that although a specific main and pilot valve structure is shown however, the invention is equally applicable with a wide variety of different types of main valves and pilot valves.

DESCRIPTION OF FIGURES

The present invention is illustrated with respect to preferred embodiments thereof in the accompanying drawings wherein.

DESCRIPTION OF PREFERRED EMBODIMENTS

Figure 1:
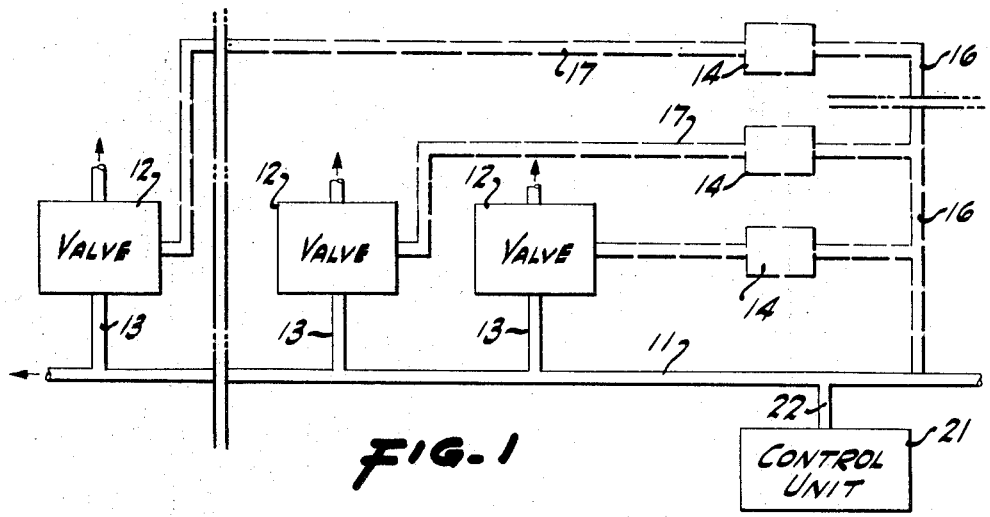
FIG. 1 is a schematic illustration of a piping system as may be controlled by the present invention and including a showing in dotted lines of a prior art control system.

Referring first to FIG. 1 there will be seen to be schematically illustrated a portion of a piping system including a main line or header 11 which may extend from some type of air supply, for example, to a plurality of valves 12, separately connected to this header by branch lines 13. The branches, with each having a valve therein, may lead to separate portions of the overall system which are to be selectively connected to the header. While it is clearly possible to manually operate individual valves of the system, it is more conventional to provide some type of pilot control to more readily and rapidly operate the valves. This in itself is quite conventional. Additionally it is common to provide remote control for operating or actuating the valves of the system, particularly in circumstances where any substantial number of valves may be involved and they may be located at rather widely spaced points. One common manner of providing this remote control is illustrated in FIG. 1 by dashed lines. Such a system may include a plurality of small control valves 14 connected from a common branch line 16 of the header and having output lines extending to separate main valves 12. These control valves may be quite small and located at a single remote control position so that they are readily operated from a single location. The individual control valves 14 operate as separate pilot valves for the main valves 12, as for example by applying or removing pressure upon a spring-loaded piston actuating a movable member of the main valve.

A remote control system employing remotely located control of pilot valves, as briefly identified above, certainly accomplishes the objective of remote operation of the main valves. It does, however, have the disadvantage of requiring a considerable amount of control piping, as illustrated by the control lines 17 extending from the control valves 14 to the main valves 12. The present invention on the other hand provides a single control unit 21 connected by a single pipe 22 to the main line or header 11 and located at a desired control position. No other piping is required and thus the present invention precludes the necessity of employing all of the piping 17 of FIG. 1. The control unit 21 operates to selectively generate vibrations which are transmitted through fluid contained in the main line or header 11 through the branch lines 13 to separate valves 12. These valves 12, in accordance with the present invention, are each provided with actuators having selective vibration-responsive means for actuation of same.

Figure 2:
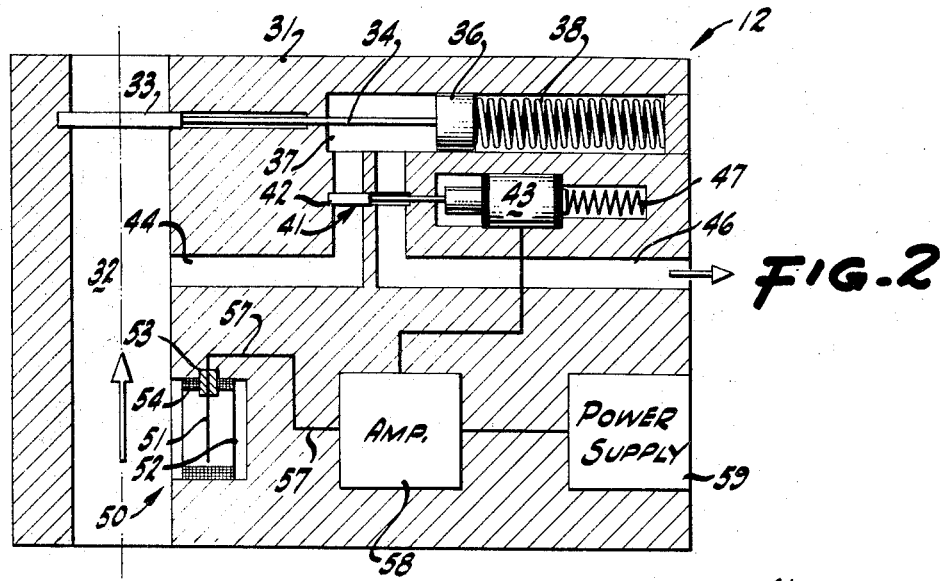
FIG. 2 is a schematic central sectional view through a vibration control valve in accordance with the present invention.

Considering now the improved valve and valve actuation of the present invention, reference is made to FIG. 2 wherein there is schematically illustrated elements of a valve in accordance herewith. It is particularly noted that no attempt is made in FIG. 2 to show an optimized valve design but instead the FIG. is intended only to illustrate the invention. In general the valve 12 includes a valve body 31 having a main passage 32 therethrough with a gate or other movable valve means 33 disposed in the body for movement into and out of closing relationship to this passage 32. In the following description the valve closing and opening element is termed the movable valve element for it is to be appreciated that it may be a gate, ball, cylinder or any of the various types of means employed in a valve to close and open same. This particular embodiment illustrates a gate element 33 which will be seen to have a stem 34 extending therefrom to a spring-loaded piston 36. This piston is disposed in a cylinder 37 which may be located within or without the valve body and which contains a compression spring 38 between the piston and cylinder end as shown. This spring 38 will thus be seen to urge the piston to the left for closing the valve passage by disposing the gate 33 across same.

In order to provide for opening of the valve 12, this embodiment provides a pilot valve 41 which may, for example, be formed or located within the valve body. In the illustrated embodiment this pilot valve 41 is provided with a movable valve element 42, illustrated as a gate that is operated by a solenoid 43. The valve 12 is also provided with auxiliary or pilot valve inlet and outlet passages or lines 44 and 46 respectively. The inlet line extends from the main line valve passage 32 to the cylinder 37 on the opposite side of the piston 36 from the spring 38. The outlet line 46 extends from this same portion of the cylinder to the atmosphere or some low-pressure return line. Again it is noted that the valve and system illustrated may be operable upon air and in this instance the outlet line 46 is merely an exhaust line to the atmosphere. The pilot valve 41 has the gate 42 thereof movable between closing relation to either the inlet or outline lines 44 and 46. Thus, as will be seen from FIG. 2, the pilot valve gate 42 is disposed in closing relation to the inlet line 44 to leave the exhaust line 46 open or is moved by the solenoid to open the inlet line 44 and close the exhaust line 46.

From the above description of relatively conventional valve components it will be seen that the movable member or gate 33 of the valve 12 is moved between open and closed relation to the valve passage 32 by operation of the pilot valve 41. With the pilot valve gate 42 moved by solenoid 43 to open position with respect to the inlet line 44 and closed position with respect to the exhaust line 46, air pressure will be applied to the piston 36 to compress spring 38 and withdraw the main gate 33 from the valve passage. Deenergization of the solenoid 43 causes movement of the pilot valve gate 42 out of the exhaust passage 46 and into the inlet passage 44. It is to be noted that the solenoid 43 is spring loaded by the spring 47, so as to normally urge the pilot valve gate 42 into closing relation to the inlet line 44 thereby exhausting the main chamber of cylinder 37. Consequently deenergization of the solenoid 43 results in the pilot valve closing the inlet line 44 and opening the exhaust line 46 so that the piston 36 is moved to the left by spring pressure 38 to close the main valve.

The present invention provides for vibration control of the valve described above and illustrated in FIG. 2. This vibration control is accomplished by an actuator 50 which is illustrated as comprising a thin metallic reed or diaphragm or the like 51 mounted in communication with the main valve passage 32, as for example in a recess 52 in the valve body. The element 51 is mounted by an insulator 53 to extend into communication with fluid passing through the valve so as to thereby be subjected to vibrations of such fluid. A magnet 54 is shown to be provided in this recess 52 to establish a magnetic field into which the element 51 extends. As shown, the element 51 extends between the pole pieces of the magnet so as to be generally aligned with the lines of force of the magnetic field and thus it will be appreciated that upon substantial vibration of the element 51 acting as a conductor in the magnetic field there will be induced a current in such element. An electrical conductor 57 extends from the element 51 to an amplifier 58 which amplifies the signal generated by the vibrating element and applies such signal either directly or indirectly to the solenoid 43 for energizing same. In the drawings a power supply 59 is shown to be provided for operating the amplifier 58 and in practice this may comprise only a connection to a conventional power outlet. The amplifier may also include a switch operated by the input signal to apply power supply voltage to the solenoid.

With regard to the electrical portion of the valve 12 it is again noted that only schematic illustration is included in the showing. It is believed apparent that various configurations of vibration-responsive elements and mountings therefor are possible as well as wholly alternative electrical circuitry associated therewith. For example it is possible to employ the output of the vibrating element in a magnetic field as a control signal for a relay applying energization to a solenoid. Also it is possible for the main valve to be solenoid operated without employing a pilot valve by using the signal from the element 51 to control energization of a main valve solenoid.

Figures 3, 4:
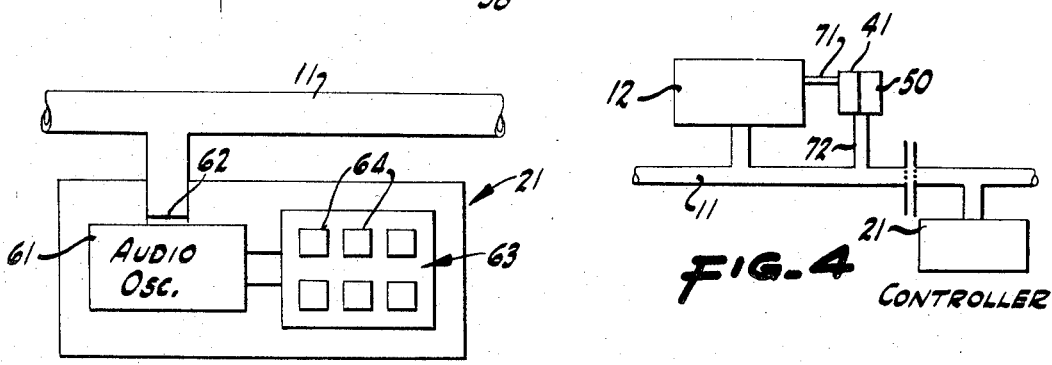
FIG. 3 is a schematic illustration of a remote control unit as may be employed in the present invention.
FIG. 4 is a schematic illustration of a portion of a valve control system in accordance with the present invention and incorporating separated valves and actuators.

An additional element of the valve control system of the present invention comprises the control unit 21, as shown in FIG. 3. This unit is, as stated above, connected to the header or main line 11 as by a pipe 22. The control unit may actually be very simply comprised, for example, by an audio oscillator 61 having a plurality of predetermined different nonharmonic operating frequencies and having the output thereof coupled as by means of a diaphragm 62 to the fluid in the pipe 11. The output of the audio oscillator may be controlled by a panel 63 of switches, buttons or the like 64 to establish or control the frequency of oscillator output. The predetermined output frequencies of the oscillator 61 are set to equal or substantially equal the different resonant frequencies of the separate vibration-responsive elements of separate valves 12 in the system.

Thus operating the first button or switch of the panel 63 of the control unit may, for example, cause the oscillator 61 to generate a signal of substantially the same frequency as the first valve 12 of the system of FIG. 1 and to propagate vibrations of this frequency through the fluid of the system by means of the output diaphragm 62 of the oscillator. This particular frequency will, of course, be received by and will operate upon each of the vibration responsive elements of the separate actuators, however, only one of these elements will be vibrated at the resonant frequency thereof. Consequently, such element will vibrate with a much greater amplitude than any other and will consequently produce a signal of more substantial amplitude. If desired the amplifier 58 may incorporate a threshold limiter so that no output will be produced for input signals below a predetermined level. Consequently, vibrations of resonant elements that are substantially less than the resonant frequency thereof will not cause an electrical signal to be passed to the solenoid for operating the pilot valve.

Although the embodiment of the present invention described above incorporates a main valve, pilot valve and actuator in a single valve body, such is clearly not necessary. In FIG. 4 there is shown part of an alternative arrangement in which the pilot valve and actuator are separated from the main valve. Referring briefly to FIG. 4 wherein previously described elements are similarily numbered the pilot valve 41 is shown to be located adjacent the main valve 12 and connected thereto by a short pipe 71. The pilot valve 41 is also connected to the header 11 by a short pipe or conduit 72. The actuator 50 communicates with this conduit 72 and may be incorporated in the pilot valve body or separate therefrom. It is herein considered that the actuator 50 includes an amplifier and is connected to and operates the pilot valve with appropriate power supply connections. The same control unit 21 is employed and in fact the system is actually the same as described above but for physical separation of valves and actuator.

Although the description of operation of the present invention has been incorporated with the description of possible structure thereof it is again briefly noted that the control system of this invention incorporates a control unit 21 connected to a main pipe or header 11 of a piping system and that such control unit may be positioned at any desired location. This control unit contains a vibration generator operable at a number of predetermined selected frequencies for generating and transmitting vibrations through fluid carried within the piping system controlled by the invention. The individual valves of this system connected to the aforementioned header or main pipe are operated by an associated actuator having a vibration-responsive element communicating with fluid in the header. This vibration-responsive element is illustrated to be embodied as a metallic reed or diaphragm fixedly mounted in communication with the header, a main valve passage, or the pipe leading thereto so as to be subjected to vibrations of fluid therein as generated by the control unit. The vibration control unit or actuator for each valve has a predetermined resonant frequency substantially equal to one of the output frequencies of the control unit. When the fluid is vibrated at the resonant frequency of a vibration-responsive element of a valve actuator, such element then resonantly vibrates in response thereto. The element is disposed in a magnetic field which may be formed by a permanent magnet, or an electromagnet if desired. Resonant vibration of the element in response to fluid vibrations causes this electrically conducting element to move in a magnetic field and thereby generate a current which is employed, preferably through an amplifier, to actuate a solenoid for controlling pilot valve position, which in turn then operates or actuates the main valve to open or close same.

Each of the valves to be controlled by the system hereof has associated therewith an actuator containing a vibration-responsive element and each of such elements has a resonant frequency which is different from the resonant frequency of the others and is not a harmonic thereof. Thus only a single valve is operated at a time by generation of a particular predetermined frequency of vibration of fluid at the control unit. It is to be appreciated that these vibrations are very readily transmitted by fluid in piping, substantially whatever type of fluid may be employed. Thus the invention employs the regular piping or conduits of the system to be controlled and precludes the necessity of auxiliary or control piping, as is required in the prior art system generally indicated in FIG. 1, for example. Provision may also be made for the oscillator of the control unit to simultaneously produce outputs of more than one frequency under those circumstances wherein it is desired to open more than one valve at a time. In this respect it is possible to employ more than one output vibrator of the oscillator but in general systems of this type are called upon to operate but a single valve at a time. It is of course inherent in design of a system employing the present invention that the resonant frequencies of the vibration-responsive element and thus the output frequencies of the control unit shall be chosen so as not to conflict with any other types of vibrations that may occur in the system.

Although the present invention has been described with respect to a particular preferred embodiment thereof it has been noted that the illustration and description do not attempt to set forth an optimized design and it is believed evident that the actual physical configuration of the valve illustrated in FIG. 2, for example, is preferably modified to conform to acceptable valve design considerations. Reference is thus made to the appended claims for a precise delineation of the scope of this invention.

I claim:

1. A vibration-controlled valve having a main movable element controllably movable between closing and opening relation to a valve passage comprising an actuator including a metallic vibration-responsive element mounted in communication with said valve passage, means establishing a magnetic field passing through said element whereby substantial element vibration induces an appreciable electric current therein, and means electrically connected to said element for actuation by said current to move said movable valve element.

2. The valve of claim 1 further defined by said element having a predetermined resonant frequency and being firmly anchored for substantial vibration in said magnetic field upon subjection to vibrations of fluid in said valve passage at said resonant frequency.

3. The valve of claim 1 further defined by said means electrically connected to said element including an amplifier and a solenoid operated in response to the output thereof for actuating said movable valve member.

4. The valve of claim 1 further defined by said main movable element having a stem connected to a spring-loaded piston in a cylinder, a solenoid operated pilot valve having a movable member opening and closing inlet and exhaust passages to said cylinder, and said means electrically connected to said element producing an output controlling energization of said solenoid.

5. A remote control system for at least one valve adapted to controllably pass fluid through a pipe comprising:
 a. a valve actuator for each valve and including a vibration responsive element communicating with said pipe and having a predetermined resonant vibration frequency;
 b. means establishing a magnetic field through each element of (a) for generating current upon resonant element vibration in said magnetic field;
 c. operating means coupled to said element and responsive to the current therein for actuating said valve; and
 d. control means communicating with said pipe and including a vibration generator operable at least at the resonant frequency of said element for transmitting vibrations through fluid in said pipe to actuate said valve.

6. The valve control system of claim 5 further defined by said control means comprising an audio oscillator having a plurality of different fixed frequency outputs corresponding to resonant frequencies of separate vibration-responsive elements with means coupling said outputs to fluid in said pipe, and selection means coupled to said oscillator for selection of separate output frequencies to actuate selected valves.